Jan. 30, 1968  R. A. POHL ET AL  3,366,345
ENVELOPE FOR MID-AIR PROTECTION FOR INFLATABLE DEVICES
Filed Oct. 24, 1965  2 Sheets-Sheet 1
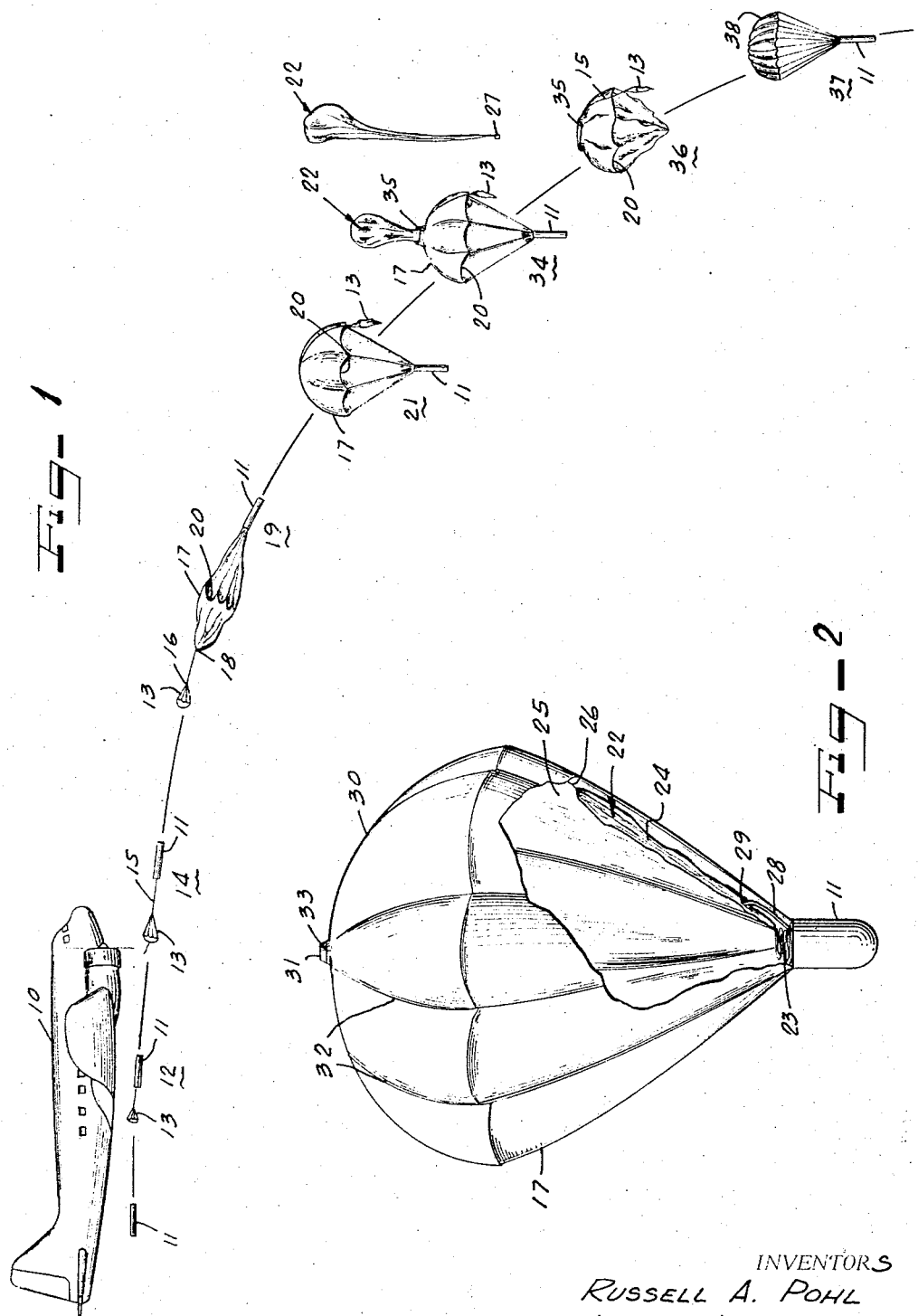
INVENTORS
RUSSELL A. POHL
JAMES A. WINKER
ATTORNEYS Jan. 30, 1968     R. A. POHL ET AL     3,366,345
ENVELOPE FOR MID-AIR PROTECTION FOR INFLATABLE DEVICES
Filed Oct. 24, 1965     2 Sheets-Sheet 2
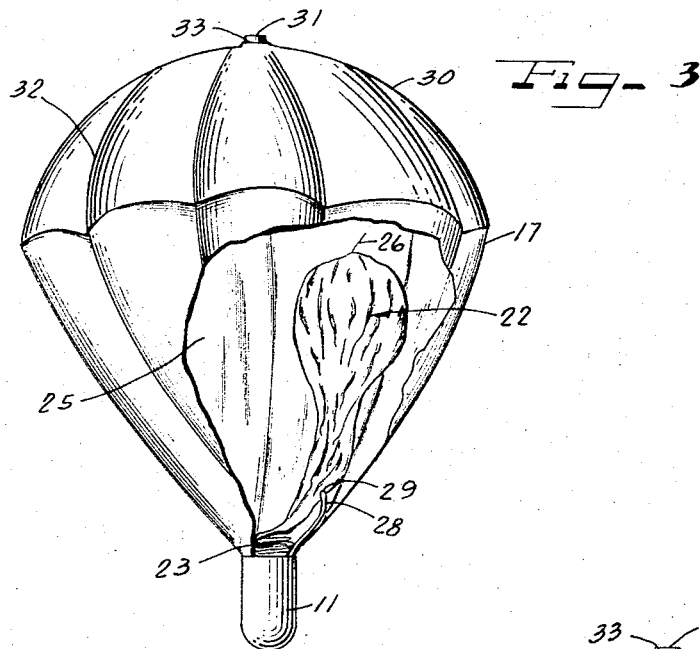
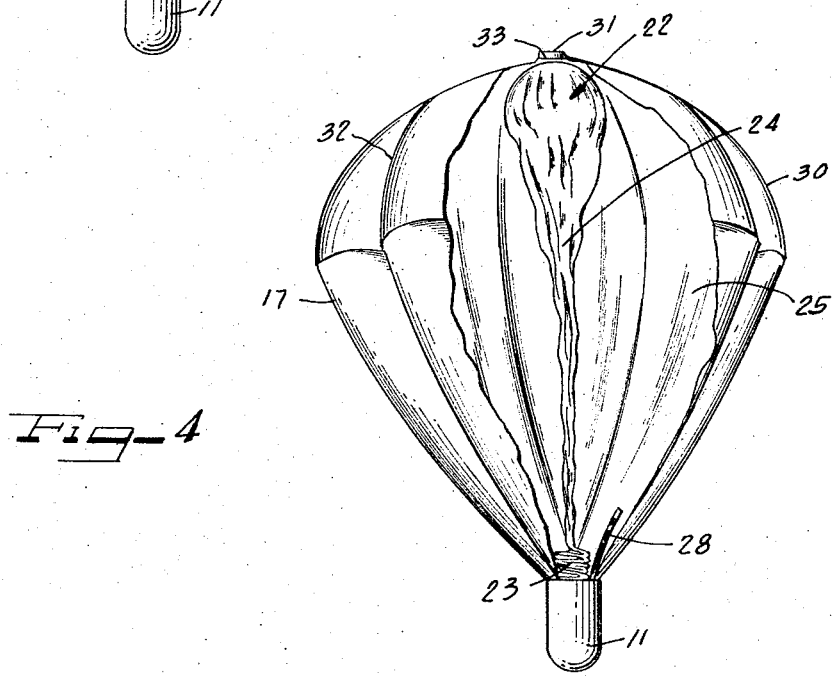
INVENTORS
RUSSELL A. POHL
JAMES A. WINKER
BY Hill, Sherman, Meroni, Gross & Simpson ATTORNEYS

United States Patent Office 3,366,345
Patented Jan. 30, 1968

3,366,345
ENVELOPE FOR MID-AIR PROTECTION FOR INFLATABLE DEVICES
Russell A. Pohl and James A. Winker, Sioux Falls, S. Dak., assignors to Raven Industries, Inc., Sioux Falls, S. Dak., a corporation of South Dakota
Filed Oct. 24, 1965, Ser. No. 504,356
9 Claims. (Cl. 244—2)

ABSTRACT OF THE DISCLOSURE

An envelope for mid-air protection for inflatable devices wherein the envelope is ram air inflatable during descent, and wherein a light gas balloon is packaged within the envelope and protected thereby against the air turbulence of descent, means being provided for inflating the light gas balloon during descent and means also being provided for releasing the light gas balloon from the envelope after the movement of the assembly has been slowed due to the aerodynamic effects on the envelope.

---

This invention relates to a device for launching a light gas balloon and in particular to a device for protecting the inflation of a balloon when deposited at high altitudes and at high speeds relative to the environmental air.

Launching balloons from air-borne vessels or space vehicles has significant advantages over launching from ground based sites. Principally, ground launchings tend to be more cumbersome in that provision must be made for the gas balloon to rise through an air environment that has decreasing lift with increasing altitude. In addition, ground based sites are limited, while air-borne sites have the advantage of maneuverability and speed to pursue changing weather patterns or other matters of concern.

There has developed increasing emphasis for the surveillance of weather conditions as well as military matters from high-speed vehicles such as jet aircraft, rockets, and satellites. It is recognized, however, that such surveillance can be appreciably enhanced by the use of lighter-than-air balloons which may ascend or descend to areas of particular interest.

Launching a balloon at high speeds, however, introduces, against the thin balloon skin, the full turbulent effects of high-speed air and high pressures, unless protective means are provided to guard the balloons during early periods of the launch. This invention concerns such a means.

Accordingly, it is a principal object of this invention to provide a shield for the inflation of a light gas balloon after launching from a high-speed vehicle.

It is also an object of this invention to provide an external balloon which may be launched from an air-borne vehicle and which develops a protective environment during descent for the inflation of a light gas balloon.

It is another object of this invention to provide a mother balloon which is ram air inflated after launch from an air-borne vehicle and which has a closure top for releasing a light gas balloon therethrough.

It is further object of this invention to provide a ram air inflated mother balloon for launching from a high speed air-borne vehicle which contains a light gas balloon and which has a line cutter therein for releasing the gas balloon through an aperture at the apex of the mother balloon, wherein the gas balloon rises to selected altitudes and the mother balloon and assembly descend to ground level.

These and other objects, features and advantages of the present invention will be understood in greater detail from the following description and the associated drawings wherein reference numerals are utilized in designating a preferred embodiment and wherein:

On the drawings:

FIGURE 1 is a sequential launch diagram illustrating the various phases of a balloon launch according to this invention;

FIGURE 2 illustrates an enlarged view of the mother balloon of this invention, having a cut-away section for showing a first stage in the inflation sequence of a light gas balloon contained therein;

FIGURE 3 is a view similar to FIGURE 2, showing a subsequent stage in the inflation of the light gas balloon contained within the mother balloon during recent descent thereof; and FIGURE 4 is a further view of the mother balloon having a cut-away section and showing the light gas balloon in a substantially fully inflated state.

As shown on the drawings:

This invention concerns generally an external balloon which itself can sustain high dynamic pressures and which, in fact, utilizes such pressures for attaining an inflated state and which carries a light gas balloon therein. The external balloon, because of its ability to sustain high dynamic pressures, may be launched at high speeds relative to the air environment. While it is being inflated and during inflation, the external balloon provide a protective environment for a light gas balloon which is packaged at the interior thereof. The entire assembly is readily slowed to desirable speeds due to the drag of the external balloon, and at a designated point in the launch, the gas inflated internal balloon is energized and released through an aperture provided in the external balloon. Cutting means are included within the assembled package, and at the proper interval the internal and external assembly is severed and the light gas balloon is allowed to rise to a designated altitude, while the external balloon descends uninterrupted.

An illustrative embodiment of the inflation sequence and apparatus is shown in FIGURE 1 and comprises generally a launch craft 10 which may be either an aircraft, as shown in the diagram, or a rocket or an orbiting satellite. At time zero, the aircraft 10 releases a container or capsule 11 which begins the sequence of launch events.

At the instant the capsule 11 is released from the aircraft, aerodynamic friction or drag begins reducing the launch speed of the assembly. At time $T=1$ second, the capsule 11 is at the location 12 in the sequence. At this point, the aerodynamic effects on the launched assembly have caused a drag chute 13 to be deployed from the container in a well understood manner.

At time $T=2$ seconds, the container 11 has reached the launch position 14 and the drag chute 13 is fully deployed and has extended from the container 11 an increased distance through a cable 15.

The cable 15 is connected directly from the drag chute 13 at a point 16 to an external or mother balloon 17 at a point 18, as seen from the deployment position 19 corresponding to $T=3$ seconds after launch. Prior to the deployment of the mother balloon 17, the container 11 and the accompanying drag chute and assembly can be seen to have lost only slight altitude in comparison to the horizontal distance traveled by the assembly. However, after deployment of the mother balloon 17, the aerodynamic resistance significantly increases and the direction of motion is rapidly reversed from a horizontal to a vertical or downward direction. The mother balloon 17 is designed to withstand the turbulent effects of the high speed experienced at the $T=3$ seconds point and, in fact, is provided with air scoops 20 which permit the on-rushing air to enter the balloon cavity for self-inflation purposes. The inflation of the balloon 17 in this manner is commonly referred to as ram air inflation and requires no internal inflating source.

Finally, at the deployment point 21, the mother balloon 17 is fully inflated and has attained a normal cavity filled configuration. At this point, the entire assembly has been slowed considerably as witnessed by the sudden downward movement of the trajectory and, accordingly, the drag chute 13 is collapsed and expanded.

At the launch point 21, the inflation sequence of the inner gas balloon is initiated. This may be accomplished either by a timing device or more simply by the full inflation of the mother balloon.

The inflation of the light gas balloon may be understood by reference to FIGURES 2, 3 and 4 in the drawings. The cut-away portion of the mother balloon, in FIGURE 2, illustrates the positioning of the light gas balloon 22 during the launch position 21. The gas balloon 22 has a folded portion 23 remaining within the rigid container 11 and an extended portion 24 residing along the inner surface 25 of the mother balloon 17. The balloon 22 may be maintained in this position by a tie string 26 or similar device which may be readily disengaged upon inflation of the balloon 22.

A payload 27 which may comprise weather-sensing equipment or the like is disposed within the container 11 during the early launch period. Similarly, gas bottles containing the required light gas system for inflating the balloon 22 are packaged within the container 11 along with the payload 27 and are attached through a gas inflation tube 28 to the light gas balloon 22 at a point 29.

In FIGURE 3, the balloon 22 has begun to inflate and the tie string 26 has disengaged from the inner surface 25 of the mother balloon 17. The gas inflation tube 28 remains connected to the balloon skin at the point 29 and the payload remains within the container or capsule 11.

In FIGURE 4, the light gas balloon 22 is fully inflated and is extended within the mother balloon 17 to the full extent permissible by the confinement of the canopy. At this point, a line cutter mechanism such as a pyrotechnic or mechanical line cutter has been employed for severing the connection of the gas inflation line 28 to the wall of the light gas balloon 22. Therefore, the gas filled balloon 22 remains encased within the mother balloon 17 and is confined therein only by the enclosure provided by the canopy. It may be noted, therefore, that the light gas balloon 22 has reached a fully inflated state at significantly high speeds, and this has been accomplished entirely within the protective environment established by the enclosed canopy of the mother balloon 17.

It can be seen in FIGURES 2, 3 and 4 that the upper portion or dome 30 of the mother balloon 17 is provided with a closure top 31 which is pleated at lines 32 and which is bound by a tie line 33. When the launch assembly reaches the launch point 34, the tie line 33 is cut in a similar manner to the cutting of the gas inflation line 28 and the closure top 31 of the mother balloon 17 is allowed to expand to produce a substantially enlarged aperture 35. The size of the aperture can range from a few percent to 100% of the maximum balloon diameter (balloon equator dimension).

With the opening of the aperture 35, the restraining means on the gas filled balloon 22 is removed and that balloon is allowed to rise through the aperture unimpeded to points external of the protective environment. However, the balloon system has been substantially slowed such that the air environmental conditions are suitable for accomplishing the successful launch of the gas filled balloon.

The gas filled balloon 22 rises entirely outside of the mother balloon 17 and continues on a predetermined course as is well understood. With the launching of the light gas balloon, however, the mother balloon can no longer sustain its inflated state, as it was ram air inflated and the aperture 35 allows in-rushing air to escape therethrough. Consequently, the mother balloon tends to collapse and free-fall to earth together with the inflation bottles associated with the gas balloon 22. This free-fall of the mother balloon is indicated by the launch position 36.

If desired, a further launch stage 37 may be accomplished wherein a standardized chute 38 is deployed from the container 11, allowing the container and its associated operable parts to descend gradually to earth where they can be recovered and reused.

Should higher speed launchings become desirable, the mother balloon 17 may be impregnated with a resin which rigidifies upon being stimulated by a catalyst. Under such circumstances, the plated aperture area 35 would not be impregnated to allow proper releasing of the light gas balloon once the assembly has reached the selected altitude and speed.

It is understood that various modifications and combinations may be suggested by the disclosure of the illustrative embodiment herein, and we desire to claim as our invention all such modifications as properly come within the scope and spirit of the embodiment described.

We claim as our invention:

1. A mechanism for launching a mid-air inflatable device comprising:
   a collapsible inflatable envelope ejected in a compressed state above ground level at relatively high speeds,
   said collapsible envelope having means for ram air inflation by the aerodynamic effects thereon during descent, the inflation of said envelope and the consequential movement through environmental air causing a significant reduction in the speed of said envelope, an inflatable device carried within said envelope and being protected from the aerodynamic effects of onrushing air by the inflation of said envelope, means for inflating said inflatable device during descent, and
   means for releasing said device free of said envelope at speeds substantially lower than ejection speed.

2. A mechanism for launching a mid-air inflatable device comprising:
   a substantially rigid container or capsule for being ejected above ground level at a relatively high speed,
   a collapsible inflatable envelope packaged in a compressed state within said container,
   means for deploying said envelope from said container during descent thereof,
   said collapsible envelope being inflated by the aerodynamic effects thereon during descent,
   the inflation of said envelope and the consequential movement through environmental air causing a significant reduction in the speed of said envelope,
   an inflatable device carried within said envelope and being protected from the aerodynamic effects of onrushing air by the inflation of said envelope,
   means within said container for inflating said inflatable device during descent,
   pre-set means for forming an aperture near the top of said envelope,
   means for releasing said inflatable device after inflation thereof through the aperture formed by said pre-set means and for freeing said device from said envelope and said container.

3. A mechanism for launching a mid-air inflatable device comprising:
   a mother balloon for being ejected above ground level at relatively high speed,
   said mother balloon having means for ram air inflation during descent thereof,
   a light gas balloon packaged within said mother balloon and being protected thereby against the air turbulence of descent,
   means for inflating said light gas balloon after inflation of said mother balloon and during descent thereof,
   a closure top formed at the apex of said mother balloon, means for opening said closure top during the descent and after inflation of the light gas balloon, and means for freeing said light gas balloon through the opening and for severing all connections therefrom to said mother balloon, whereby said mother balloon may continue the descent and the light gas balloon may float to a predetermined altitude and location.

4. A mechanism for launching a mid-air inflatable device comprising:

a mother balloon for being ejected above ground level at relatively high speed, said mother balloon having means for ram air inflation during descent thereof, a light gas balloon packaged within said mother balloon and being protected thereby against the air turbulence of descent, means for inflating said light gas balloon after inflation of said mother balloon and during descent thereof, an aperture formed at the apex of said mother balloon, said aperture being pleated together and a line binding said aperture circumferentially to permit said mother balloon to take a natural shape when inflated, a line cutter secured for severing said line upon actuation thereof.

means for freeing said light gas balloon through the opening engendered by said line cutter.

5. A mechanism for launching a mid-air inflatable device comprising:

a substantially rigid container or capsule for being ejected above ground level at a relatively high speed, a mother balloon packaged within said container, a drag chute exterior to said container for deploying said mother balloon therefrom during descent, said mother balloon being ram air inflatable during descent thereof, a light gas balloon packaged within said mother balloon and being protected thereby against the air turbulence of descent, at least one light gas bottle within said container for inflating said light gas balloon during descent, an aperture formed at the apex of said mother balloon, said aperture being pleated together and a line binding said aperture circumferentially to permit said mother balloon to take a natural shape when inflated, a line cutter secured for severing said line upon actuation thereof, means for freeing said light gas balloon through the opening engendered by said line cutter, whereby said container, gas bottle, and mother balloon fall to earth and said light gas balloon rises to predetermined altitudes.

6. A method for launching a mid-air inflatable device comprising:

ejecting a flexible inflatable envelope above ground level at a relatively high speed, inflating said envelope during descent, packaging a light gas balloon within said envelope and inflating said balloon during descent after inflation of said envelope, forming an aperture at the apex of said envelope and allowing said light gas balloon to rise through said aperture, severing all connections between said light gas balloon and said envelope and causing said envelope to descend while allowing said balloon to rise to a selected altitude and location.

7. A method for launching a mid-air inflatable device comprising:

releasing a mother balloon above ground level at a relatively high speed, ram air inflating said mother balloon, inflating a light gas balloon within said mother balloon during descent thereof, opening a pleated closure at the top of said mother balloon by cutting a tie line during descent, allowing said light gas balloon to ascend through the resulting opening at the top of said mother balloon at relatively low speeds, and severing all connections between said light gas balloon and said mother balloon.

8. A method for launching a mid-air inflatable device comprising:

releasing a capsule or container at relatively high speeds above ground level, employing a drag chute to deploy a mother balloon from said capsule, ram air inflating said mother balloon, inflating a light gas balloon within said mother balloon during descent thereof, opening a pleated closure at the top of said mother balloon by cutting a tie line during descent, allowing said light gas balloon to ascend through the resulting opening at the top of said mother balloon at relatively low speeds, severing all connections between said light gas balloon and said mother balloon, and allowing said mother balloon and container to fall to earth and causing said light gas balloon to rise to a preselected altitude and location.

9. A mechanism for launching a mid-air inflatable device comprising:

a mother balloon for being ejected above ground level at relatively high speed, said mother balloon being ram air inflatable during descent thereof, a light gas balloon packaged within said mother balloon and being protected thereby against the air turbulence of descent, means for inflating said light gas balloon after inflation of said mother balloon and during descent thereof, a closure top formed at the apex of said mother balloon, said mother balloon, excepting said closure top, formed of a resin impregnated fabric, a catalytic agent carried by said mother balloon and activated after inflation thereof, said catalytic agent causing said resin impregnated fabric to rigidize, means for opening said closure top during the descent and after inflation of the light gas balloon, and means for freeing said light gas balloon through the opening and for severing all connections therefrom to said mother balloon, whereby said mother balloon may continue the descent and the light gas balloon may float to a predetermined altitude and location.

References Cited
UNITED STATES PATENTS

| | | | |
|---|---|---|---|
| 2,967,677 | 1/1961 | Winzen et al. | 244—2 |
| 3,168,266 | 2/1965 | Yost | 244—31 |
| 3,282,533 | 11/1966 | Spain | 244—1 |
| 3,298,634 | 1/1967 | Kantor et al. | 244—31 |

FERGUS S. MIDDLETON, *Primary Examiner.*

MILTON BUCHLER, *Examiner.*

T. MAJOR, *Assistant Examiner.*